Patented Apr. 8, 1930

1,753,898

UNITED STATES PATENT OFFICE

HARRY A. MERKLE, OF NITRO, WEST VIRGINIA, ASSIGNOR TO THE RUBBER SERVICE LABORATORIES COMPANY, OF AKRON, OHIO, A CORPORATION OF OHIO

MANUFACTURE OF AROMATIC THIAZOLE COMPOUNDS

No Drawing.  Application filed July 14, 1927. Serial No. 205,851.

The present invention relates to the art of manufacturing mercapto-aryl-thiazole compounds by an improved process whereby high yields of the desired compounds in a substantially pure form are realized. The process as hereinafter set forth is particularly applicable to the manufacture of mercapto-benzo-thiazole and other analogous compounds by heating phenyl mustard oil and the like with sulphur under pressure in the manner as described in the following examples and in the presence of a catalyst of the reaction. The reaction whereby the desired product is obtained is as follows:

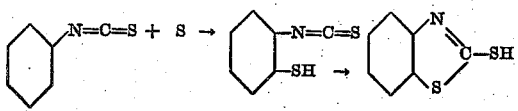

The preparation of mercapto-benzo-thiazole by the reaction of phenyl mustard oil with sulphur has been previously reported by Jacobson and Frankenbacher in Berichte, volume 24, page 1400 (1891). These investigators obtained a yield of but 45% of the theoretically possible yield of the thiazole by heating the ingredients together in a sealed tube for five hours. This procedure was repeated by Sebrell and Boord (Jour. Am. Chem. Soc. vol. 45, 2390, 1923) who reported a yield of but 60% of the thiazole. These same investigators prepared mercapto-benzo-thiazole by four other processes but the best yield of thiazole they were able to obtain was but 77.5% of the theoretical yield. Such a low yield requires that the thiazole must be purified for use in any process or in the manufacture of any desired derivative of the thiazole and inasmuch as the side reaction products are for the most part of tar like consistency, the purification steps are troublesome to carry out and materially affect the cost and yield of the product.

I have now discovered that yields of from 88 to 92 and even higher percentages of an aryl-thiazole compound can be consistently obtained by heating a mustard oil with sulphur at elevated temperatures under pressure and in the presence of a suitable reaction catalyst. As a catalyst, I have found that the so-called ionizing solvents, particularly water, yield the most favorable results in the process. If water be employed, it can be added as such to the mixture in the reaction vessel or chamber or may be added in the form of a hydrated salt of any non-reactive substance from which the water of hydration is evolved under the reaction condition imposed.

Example 1

The following example is illustrative of one mode of carrying out the reaction. An autoclave or other suitable container constructed of heavy materials to withstand high pressures was charged with a quantity of a mustard oil and sulphur in the ratio of their respective molecular weights. Thus, for every 135 parts of phenyl mustard oil there were taken 32 parts of sulphur. To this charge there was added from approximately one to 5% (on the weight of the mixture) and preferably about 3.5% of water or of any suitable material liberating approximately this quantity of water under the operating pressures and temperatures employed in the process. The reaction vessel containing the charge was then tightly closed and was heated until a pressure of approximately 185 pounds per square inch or thereabout was indicated in the vessel. This pressure was built up by the gases evolved in the reaction. Although the heating step described can take place at a relatively rapid rate I have found that the highest yield of the desired product is realized if the heat is applied at such a rate that from 1½ to about 2½ hours are required to reach the temperature needed to build up the desired pressure.

The following table shows the results obtained when the heating step was carried out in the manner as indicated. The first column represents the time interval consumed in increasing the temperature of the mass as shown, the second column indicates the temperature of the reacting mass, and the third column shows the pressure built up in the reaction chamber at the various temperatures.

| Time interval | Temp. °C. start | Pressure in lbs./in² |
|---|---|---|
| 5 minutes | 45 | |
| 5 minutes | 77 | |
| 5 minutes | 118 | |
| 5 minutes | 141 | |
| 5 minutes | 155 | |
| 5 minutes | 184 | |
| 5 minutes | 190 | 50 |
| 5 minutes | 196 | 65 |
| 5 minutes | 204 | 80 |
| 5 minutes | 211 | 115 |
| 5 minutes | 220 | 140 |
| 5 minutes | 223 | 170 |
| 5 minutes | 224 | 170 |
| 5 minutes | 220 | 175 |
| 5 minutes | 220 | 180 |
| 5 minutes | 222 | 185 |
| 5 minutes | 221 | 185 |

In the example set forth, the temperature was gradually increased to about 220° C. and maintained approximately at that point for some time to permit the reaction in the chamber to be completed as is indicated by the production of the maximum pressure conditions shown.

After a pressure of approximately 185 pounds had been reached, the heating of the vessel was discontinued and the mass was allowed to stand until the temperature of the contents of the vessel had dropped to about 125° C. When the cooling of the mass had taken place to the point indicated, any residual pressure upon the vessel was released and the reaction product was withdrawn from the vessel.

The product upon analysis was found to contain 98.3% mercapto-benzo-thiazole.

Example 2

Another preparation of the same reaction product was carried out in which the same charge was employed but wherein the heating conditions were changed over those set forth in the preceding example. The heating was carried out in the manner indicated by the following temperature and pressure chart.

| Time interval | Temp. °C. start | Pressure in lbs./in² |
|---|---|---|
| 7 minutes | 61 | |
| 5 minutes | 104 | |
| 5 minutes | 140 | |
| 5 minutes | 175 | |
| 5 minutes | 195 | 60 |
| 5 minutes | 205 | 85 |
| 5 minutes | 212 | 110 |
| 5 minutes | 220 | 145 |
| 5 minutes | 228 | 190 |
| 5 minutes | 234 | 200 |
| 5 minutes | 235 | 210 |
| 5 minutes | 237 | 225 |
| 5 minutes | 238 | 230 |
| 5 minutes | 242 | 240 |
| 5 minutes | 238 | 240 |
| 5 minutes | 237 | 240 |
| 5 minutes | 240 | 250 |
| 5 minutes | 238 | 255 |
| 5 minutes | 236 | 255 |

In this example the temperature was increased somewhat more rapidly to a higher point than was employed in the preceding example and was maintained substantially at that point for from 30 to 50 minutes, during which time a maximum pressure was built up. The mass was then allowed to cool down as before, residual pressure was released and the product was obtained. In this example, the mercapto-benzo-thiazole obtained analyzed 97.8%.

Other examples have been carried out in which different proportions of the ingredients specified have been heated at varying rates and to different temperatures and pressures. The best results, however, have been obtained by heating a mixture of a mustard oil with sulphur in the proportions indicated and in the presence of the catalyst to a temperature of approximately 220 to 240° C. and then to maintain the temperature substantially at that point for from 30 minutes to an hour in order to permit the maximum pressure possible at that temperature to be developed and the reaction to be completed.

By operating in a like manner the mercapto-tolyl and xylyl thiazoles have also been obtained in higher yields than have heretofore been found possible. Other aromatic thiazole compounds can likewise be obtained by heating other aromatic mustard oils with sulphur in the presence of a catalyst in the manner indicated.

The examples hereinbefore set forth in detail are to be considered as illustrative only and not at all limitative of the scope of my invention. My invention is not dependent upon any theories advanced in explanation of the changes involved in the reactions taking place but is limited solely by the following claims appended hereto as a part of this specification wherein I intend to claim all novelty inherent in my invention as is permissible in view of the prior art.

What I claim is:

1. The method of manufacturing a mercapto-aryl-thiazole compound which comprises heating an aromatic mustard oil and sulphur under pressure in the presence of water as a reaction catalyst.

2. The method of manufacturing a mercapto-aryl-thiazole compound which comprises heating an aromatic mustard oil and sulphur substantially in equi-molecular proportions in the presence of water as a reaction catalyst.

3. The method of manufacturing a mercapto-aryl-thiazole compound which comprises heating an aromatic mustard oil and sulphur substantially in equi-molecular proportions to a temperature of from 210 to 240° C. and under a pressure of from 175 to 255 pounds per square inch in the presence of vaporized water as a reaction catalyst.

4. The method of manufacturing a mercapto-aryl-thiazole compound which comprises heating a mixture of substantially equi-molecular proportions of an aromatic mustard oil and sulphur with approximately 3.5% of water on the weight of the mixture to a temperature of approximately 225° C. and maintaining the temperature substantially constant until a maximum pressure is developed.

5. The method of manufacturing mercapto-benzo-thiazole which comprises heating phenyl mustard oil and sulphur under pressure in the presence of water as a reaction catalyst.

6. The method of manufacturing mercapto-benzo-thiazole which comprises heating phenyl mustard oil and sulphur substantially in equi-molecular proportions in the presence of water as a reaction catalyst.

7. The method of manufacturing mercapto-benzo-thiazole which comprises heating phenyl mustard oil and sulphur substantially in equi-molecular proportions to a temperature of from 210 to 240° C. and under a pressure of from 175 to 255 pounds per square inch in the presence of vaporized water as a reaction catalyst.

8. The method of manufacturing mercapto-benzo-thiazole which comprises heating a mixture of substantially equi-molecular proportions of phenyl mustard oil and sulphur with approximately 3.5% of water on the weight of the mixture to a temperature of approximately 225° C., and maintaining the temperature substantially constant until a maximum pressure is developed.

In testimony whereof I have affixed my signature.

HARRY A. MERKLE.